United States Patent [19]
Sharp

[11] Patent Number: 5,676,456
[45] Date of Patent: Oct. 14, 1997

[54] INDICATOR DEVICE

[75] Inventor: Gordon D. Sharp, Dundee, Scotland

[73] Assignee: NCR Corporation, Dayton, Ohio

[21] Appl. No.: 644,014

[22] Filed: May 9, 1996

[30] Foreign Application Priority Data

Dec. 22, 1995 [GB] United Kingdom ............... 9526336

[51] Int. Cl.$^6$ ............... G09G 3/00; F21V 9/12
[52] U.S. Cl. ............... 362/318; 362/364; 362/351; 40/581; 349/106; 340/815.56; 340/815.66
[58] Field of Search ............... 362/28, 29, 30, 362/293, 23, 351, 355, 360, 364, 318, 147, 800; 340/815.45, 815.56, 815.66, 815.67, 815.65; 349/16, 106, 105, 110, 63; 116/202; 40/448, 581

[56] References Cited

U.S. PATENT DOCUMENTS

| | | | |
|---|---|---|---|
| 4,791,418 | 12/1988 | Kawahara et al. | 349/106 |
| 4,893,903 | 1/1990 | Thakar et al. | 40/448 |
| 4,965,564 | 10/1990 | Fabry et al. | 340/815.67 |
| 5,404,133 | 4/1995 | Morike et al. | 340/815.56 |

*Primary Examiner*—Thomas M. Sember
*Attorney, Agent, or Firm*—Michael Chan

[57] ABSTRACT

An indicator device (14) having no moving parts includes a layered assembly (26) visible through an aperture (28) in a wall member (30), and a light source (30) positioned behind the layered assembly (26). The layered assembly (26) comprises a first transparent sheet (32) of a first color, a second transparent sheet (34) of a second color, and an LCD panel (36) interposed between the two sheets (32,34). The LCD panel (36) is adapted to be rendered transparent when energized and to be rendered opaque when de-energized. When the LCD panel (36) and the light source (38) are de-energized, the first color (e.g. red) is seen through the aperture (28), and when the LCD panel (36) and the light source (38) are energized a third color (e.g. green) is seen through the aperture (28). The indicator device (14) may be used, for example, as an in-service indicator of an ATM.

16 Claims, 1 Drawing Sheet

INDICATOR DEVICE

BACKGROUND OF THE INVENTION

This invention relates to an indicator device. The invention has application, for example, to an in-service indicator device incorporated in an automated teller machine (ATM), such device providing an indication as to whether or not an ATM is operational and available for use by a customer.

A known in-service indicator device for use with an ATM takes the form of an electromagnetically operated mechanism including a flag having green and red portions. When the ATM is in service, power is applied to a solenoid actuator to position the green portion of the flag behind a slot in the fascia of the ATM so as to be visible therethrough. When the ATM is powered down or otherwise out of service, the actuator is de-energized as a result of which the red portion of the flag is moved behind the slot in place of the green portion.

In common with other mechanisms having moving parts, the known indicator device referred to above has the disadvantage that there is a tendency for it to cease to operate reliably as a result of wear. For example, because of some part of the indicator mechanism sticking, the area of the flag visible through the indicator slot may be part green and part red.

SUMMARY OF THE INVENTION

It is an object of the invention to provide an indicator device which is reliable in operation and has no moving parts.

According to the invention there is provided an indicator device characterized by a layered assembly visible through an aperture in a wall member, and a light source positioned behind said assembly, said assembly comprising a first transparent sheet-like member of a first color positioned immediately behind said aperture, a second transparent sheet-like member of a second color different from said first color, and an energizable LCD panel interposed between said first and second transparent members, said LCD panel being adapted to be rendered transparent when energized and to be rendered opaque when de-energized, whereby when said LCD panel and said light source are de-energized said first color is seen through said aperture, and when said LCD panel and said light source are energized a third color, different from said first and second colors, is seen through said aperture by virtue of light from said light source passing through said assembly.

It will be appreciated that when an indicator device in accordance with the invention is used as an in-service indicator of a machine such as an ATM, the indicator displays one color, e.g. a shade of green, when the machine is available for use, and displays a second color, e.g. a shade of red, when the machine is out of service, for example when no power is applied to the machine.

BRIEF DESCRIPTION OF THE DRAWINGS

One embodiment of the invention will now be described by way of example with reference to the accompanying drawings, in which.

DETAILED DESCRIPTION

Figure 1:
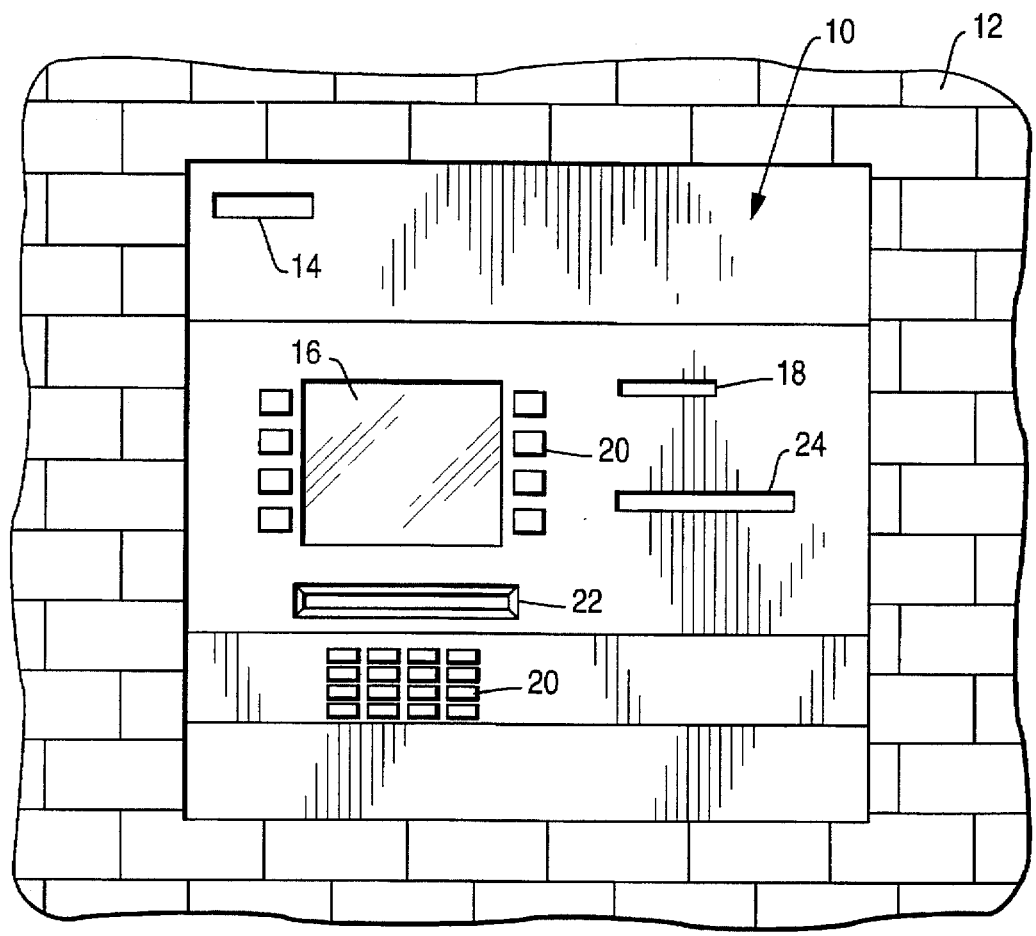
FIG. 1 is a front view of the fascia (user interface) of a through-the-wall ATM having an in-service indicator device in accordance with the invention.

Referring to the drawings, the ATM fascia 10 shown in FIG. 1 is mounted in a wall 12 of a bank or other institution. The fascia 10 conventionally includes an in-service indicator 14, a display screen 16 by means of which information and instructions may be displayed to a user of the ATM, a card entry slot 18 through which a user identifying card may be entered in the machine, a key panel and other keys 20 by means of which a user may enter identifying information and instructions into the machine, a currency present slot 22 through which a requested amount of currency notes may be presented to a user, and a receipt slot 24 through which printed receipts and statements may be issued to a user.

Figure 2:
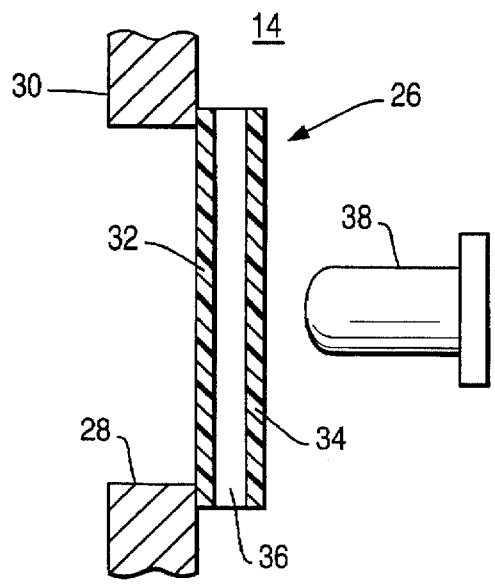
FIG. 2 is an enlarged, part-sectional, side view of the indicator device.

Referring now additionally to FIG. 2, the in-service indicator 14 includes a layered assembly 26 mounted immediately behind a horizontally extending slot 28 formed in a wall member 30 of the fascia 10, the slot typically having a horizontal dimension of 8 centimeters and a vertical dimension of 2.5 centimeters. The assembly 26 has a size slightly greater than that of the slot 28 and is secured to that part of the inner surface of the wall member 30 surrounding the slot 28, for example by means of an adhesive.

The assembly 26 comprises a first transparent plastic sheet 32 which is a shade of red in color, a second transparent sheet 34 which is a shade of blue in color, and a rigid liquid crystal display (LCD) panel 36 interposed between the sheets 32 and 34. The red colored sheet is positioned immediately behind the slot 28 as shown in FIG. 2. The sheets 32 and 34 are respectively attached to the opposed main faces of the LCD panel 36 by means of an adhesive applied around the edges of the sheets 32, 34 and the panel 36 so as to form a compact rigid assembly.

In known manner, the LCD panel 36 comprises an array of LCD elements and has a form of construction and mode of operation such that when the panel 36 is appropriately energized the whole of the panel 36 is rendered effectively transparent, and that when the panel 36 is de-energized it is rendered opaque. When rendered opaque, the panel 36 appears light gray in color.

An LED light source 38 is mounted behind the assembly 26 so that when energized it emits light towards the assembly 26 and slot 28. Preferably, the light source 38 is arranged to emit green light.

When the ATM is in service, i.e. is available for use by a customer of the institution in whose premises the ATM is installed, the light source 38 is energized and the LCD panel 36 is appropriately energized so as to render the panel 36 transparent. Thus, light from the light source 38 is transmitted through the blue colored sheet 34, the panel 36 and the red colored sheet 32 and thence through the slot 28. By virtue of the passage of the light through the colored sheets 34,32, and by virtue of arranging these sheets 34,32 to be appropriate shades of blue and red, the assembly 26 as viewed by a customer through the slot 28 will appear to be a shade of green. When the ATM is out of service for any reason, for example as a result of a breakdown in the power supply to the ATM or for some other reason not involving a breakdown in the power supply, then the light source 38 and the panel 36 are both de-energized. As a result, the assembly 26 as viewed by a customer through the slot 28 will now appear to be a shade of red, i.e. the color of the sheet 32. It will be appreciated that since the panel 36 is opaque when the ATM is out of service the color of the sheet 34 will have no effect on the appearance of the assembly 26 as viewed by a customer through the slot 28. Also, the light gray appearance of the panel 36 when it is opaque has no significant effect on the color of the assembly 26 as seen by a customer.

If desired, the light source 38 can be arranged to remain energized when the ATM is out of service for some reason other than absence of power, since the opaque panel 36 will prevent light from the light source 38 reaching the slot 28.

The indicator 14 described above has the advantages that it has no moving parts, that it provides an effective out-of-service indication regardless of whether or not there is an absence of power, and that it has a very low power consumption. Thus, the indicator 14 has a power consumption of only a few milliwatts compared with a typical power consumption of approximately 24 watts for a known solenoid operated indicator.

What is claimed is:

1. An indicator device comprising;
    a layered assembly visible through an aperture in a wall member; and
    a light source positioned behind the assembly;
    the assembly including (i) a first transparent sheet-like member of a first color positioned immediately behind the aperture, (ii) a second transparent sheet-like member of a second color different from the first color, and (iii) an energizable LCD panel interposed between the first and second transparent members;
    the LCD panel being rendered transparent when energized and rendered opaque when de-energized, the first color being seen through the aperture when the LCD panel and the light source are de-energized, a third color which is different from the first and second colors being seen through the aperture by virtue of light from the light source passing through the assembly when the LCD panel and the light source are energized.

2. An indicator device according to claim 1, wherein the first color is a shade of red and the third color is a shade of green.

3. An indicator device according to claim 2, wherein the second color is a shade of blue.

4. An indicator device according to claim 2, wherein color of the light emitted by the light source when energized is a shade of green.

5. An indicator device according to claim 1, wherein the light source is an LED device.

6. An indicator device according to claim 1, wherein the first and second transparent members are respectively attached to main faces of the LCD panel.

7. An indicator device according to claim 6, wherein the first and second transparent members are each in a form of a plastic sheet.

8. An indicator device according to claim 1, wherein the LCD panel appears gray in color when de-energized.

9. An indicator device comprising;
    a light source; and
    a layered assembly visible through an aperture in a wall member and positioned between the aperture and the light source, the assembly including (i) a first transparent sheet-like member of a first color positioned behind the aperture, (ii) a second transparent sheet-like member of a second color different from the first color, and (iii) an energizable LCD panel interposed between the first and second transparent members;
    the LCD panel being rendered transparent when energized and rendered opaque when de-energized, the first color being seen through the aperture when the LCD panel and the light source are de-energized, a third color which is different from the first and second colors being seen through the aperture by virtue of light from the light source passing through the assembly when the LCD panel and the light source are energized.

10. An indicator device according to claim 9, wherein the first color is a shade of red and the third color is a shade of green.

11. An indicator device according to claim 10, wherein the second color is a shade of blue.

12. An indicator device according to claim 10, wherein color of the light emitted by the light source when energized is a shade of green.

13. An indicator device according to claim 9, wherein the light source is an LED device.

14. An indicator device according to claim 9, wherein the first and second transparent members are respectively attached to main faces of the LCD panel.

15. An indicator device according to claim 14, wherein the first and second transparent members are each in the form of a plastic sheet.

16. An indicator device according to claim 9, wherein the LCD panel appears gray in color when de-energized.

* * * * *